No. 651,454. Patented June 12, 1900.
M. C. WILKINSON.
TIDE MOTOR.
(Application filed Aug. 1, 1899.)
(No Model.)
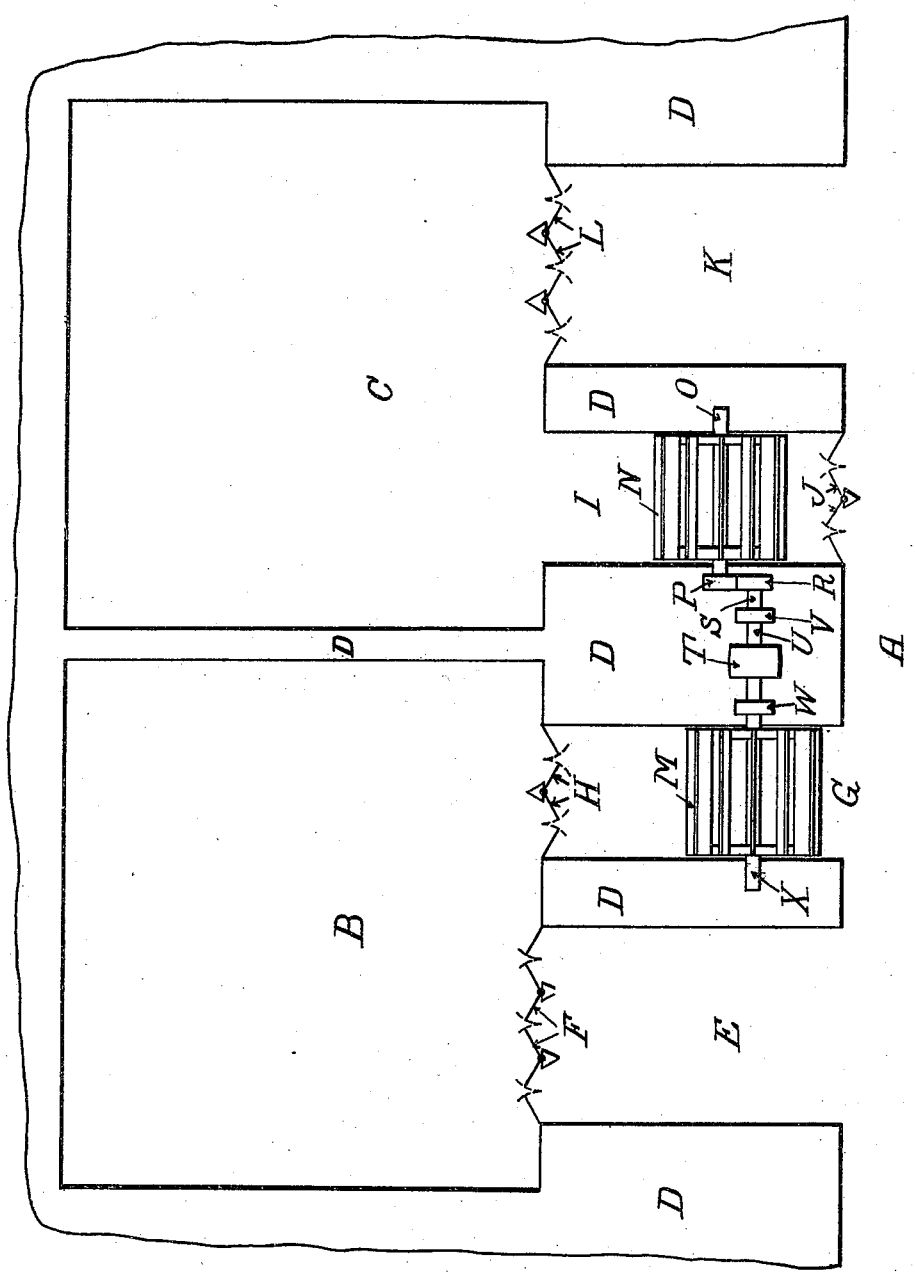
WITNESSES.
m. McGinnis
Fannie Benjamin
INVENTOR.
Melville C. Wilkinson,
Hogard & Harpham
ATTORNEYS

UNITED STATES PATENT OFFICE.

MELVILLE C. WILKINSON, OF LOS ANGELES, CALIFORNIA.

TIDE-MOTOR.

SPECIFICATION forming part of Letters Patent No. 651,454, dated June 12, 1900.

Application filed August 1, 1899. Serial No. 725,806. (No model.)

*To all whom it may concern:*

Be it known that I, MELVILLE C. WILKINSON, a citizen of the United States, residing at the city of Los Angeles, county of Los Angeles, State of California, have invented new and useful Improvements in Tide-Motors, of which the following is a specification.

My invention relates to mechanism by means of which the ebb and flow of the tide is utilized to operate water-wheels to generate power; and the object thereof is to provide means to obtain a continuous power from the rise and fall of the tide.

My invention consists in the novel construction and combination of the several parts, as hereinafter set forth, reference being had to the accompanying drawing, forming a part of this specification.

In all apparatus for utilizing the ebb and flow of the tide with which I am acquainted the power generated therein is inconstant, and therefore objectionable. In my apparatus by means of the novel arrangements of the parts I am enabled to maintain a continuous power under the variable conditions of the ebb and flow of the tide.

In the drawing, A represents any large body of water subject to the action of the tides.

B is a high-tide reservoir, and C is a low-tide reservoir, separated from each other and from the main body of water A by a wall or dike D. Reservoir B has an inlet-channel E, provided with gates F, through which the reservoir is filled at high tide, and an outlet-channel G, preferably as deep as the fall of the tide at low, low tide, provided with gates H. Reservoir C has an inlet-channel I, preferably as deep as the fall of the tide at low, low tide, provided with gates J, and an outlet-channel K, provided with gates L, through which the reservoir is emptied at low tide.

M and N are water-wheels in channels G and I, respectively, of any desired construction, depending on the height of the tide, preferably located near the bottom of said channels. On the shaft O of wheel N is gear-wheel P, working in mesh with gear-wheel R, mounted on shaft S.

T is a power-pulley mounted on shaft U.

V is a clutch by means of which shafts U and S may be thrown into and out of engagement at will. W is also a clutch by means of which shaft U and shaft X of wheel M may be thrown into and out of engagement at will.

My device is operated as follows: Assume that it is high tide and that reservoir B is full of water and reservoir C is empty and all the gates of both reservoirs are closed and shaft S coupled with shaft U and shaft U disengaged from shaft X. Gates J are opened, so that the water flowing through channel I will turn wheel N and generate the amount of force required to operate the machinery, which must be proportioned to the kind and size of the water-wheels and reservoirs used. It being observed that the water flowing through channel I in maximum flow must not be more than enough, approximately, to fill reservoir C one-third full in six hours and that the amount of water flowing out of reservoir B, maximum flow, should be regulated to empty, approximately, one-third of the water contained therein in six hours, as soon as the tide has fallen one-half its height clutch W is thrown into engagement with shaft U and clutch V disengaged therefrom. Gates J are closed, and gates H are opened, which permits the water to flow out of reservoir B and operate wheel M. At the proper time gates L are opened, so that at low tide reservoir C shall be emptied, when they are closed. As soon as the tide has again risen to one-half its height gates H are closed and gates J opened and kept open until the tide has risen and fallen to one-half height, when they are closed and gates H are again opened. Gates F are opened in season to fill reservoir B at high tide, when they are closed. This operation is repeated as long as power is desired.

In the description of the operation I have described the use of only one of the water-wheels at a time. It is obvious, however, that at certain times in the rise and fall of the tide both wheels may be advantageously coupled up to the power-transmission pulley and that it is advisable to shut down each wheel whenever the back-water seriously interferes with its power production or when the reservoir-space or water therein can be used to better advantage at a later time.

In the drawings I have shown the high and low tide reservoirs and the water-wheels adjacent to each other. It is obvious that the reservoirs will work equally well if they are a considerable distance apart by connecting their power electrically.

Having described my invention, what I claim as new, and desire to secure by Letters Patent, is—

1. In an apparatus for utilizing the ebb and flow of the tide, the combination of a high and a low tide reservoir each having an outlet and an inlet channel connecting said reservoirs with a main body of water subject to the action of the tides; gates on said channels adapted to control the passage of water through said channels; water-wheels in said channels; one of said wheels being adapted to be operated during certain periods of time by the water flowing into the low-tide reservoir from the main body of water, and the other wheel adapted to be operated during certain periods of time by the water flowing out of the high-tide reservoir; and means to utilize the power generated by each water-wheel, at times conjointly, and at other times separately.

2. In an apparatus for utilizing the ebb and flow of the tide, the combination of two reservoirs, separated from each other and from a main body of water subject to the influence of the tides, by a wall or dike; inlet and outlet channels connecting each of said reservoirs with the main body of water; gates on said channel adapted to control the passage of water therethrough; two water-wheels, one in the inlet-channel of one reservoir, and the other in the outlet-channel of the other reservoir; and means to utilize the power generated by each water-wheel, at times conjointly, and at other times separately.

3. In an apparatus for utilizing the ebb and flow of the tide, the combination of the main body of water A; reservoirs B and C; dike D separating said reservoirs from each other and from the main body A; channels E and G connecting reservoir B with water A; gates F and H on said channels; channels I and K connecting reservoir C with water A; gates J and L on said channels; water-wheel M on channel G, having shaft X; water-wheel N on channel I, having shaft O; gear-wheel P on shaft O; gear-wheel R on shaft S; power-pulley T on shaft U; shafts O, S, U and X; clutch V adapted to couple and uncouple shafts S and U; clutch W adapted to couple and uncouple shafts U and X, substantially as described herein.

In witness that I claim the foregoing I have hereunto subscribed my name, this 26th day of July, 1899, at Los Angeles, California.

MELVILLE C. WILKINSON.

Witnesses:
G. E. HARPHAM,
M. McGINNIS.